United States Patent [19]

O'Brien, Jr.

[11] Patent Number: 4,689,619

[45] Date of Patent: Aug. 25, 1987

[54] METHOD AND APPARATUS FOR POLLING SUBSCRIBER TERMINALS

[75] Inventor: Thomas E. O'Brien, Jr., Warminster, Pa.

[73] Assignee: General Instrument Corporation, New York, N.Y.

[21] Appl. No.: 813,502

[22] Filed: Dec. 26, 1985

[51] Int. Cl.⁴ .................. G08B 5/00; H04N 7/00; H04J 3/16
[52] U.S. Cl. .................. 340/825.08; 370/85; 370/90; 358/84; 358/86
[58] Field of Search .............. 340/825.08, 825.52, 340/825.5; 370/85, 94; 358/84, 86, 139

[56] References Cited

U.S. PATENT DOCUMENTS

| | | | |
|---|---|---|---|
| 4,149,144 | 4/1979 | Diefenderfer | 370/85 |
| 4,332,027 | 5/1982 | Malcolm et al. | 370/94 |
| 4,361,903 | 11/1982 | Ohta | 358/84 |
| 4,595,921 | 6/1986 | Wang et al. | 340/825.08 |

OTHER PUBLICATIONS

*Integrated Electronics: Analog and Digital Circuits and Systems,* Jacob Millman, Christos C. Halkias, 1972, p. 635.

*Primary Examiner*—Ulysses Weldon
*Assistant Examiner*—Ralph E. Smith
*Attorney, Agent, or Firm*—Barry R. Lipsitz

[57] ABSTRACT

Subscriber terminals serviced by a plurality of remotely located two-way addressable cable television systems are polled using polling command signals addressed to the different terminals from a polling center. The polling command signals are sent to the subscriber terminals via their associated headends. Responses from the polled subscriber terminals are successively received at the polling center. The round trip signal propagation times required to communicate the polling command and response signals to and from each of the headends is equalized so that the response from the polled subscriber terminals are received in the same order in which the terminals are addressed by the polling command signals. A uniform delay is inserted after each successive polling command signal to allow for variations in the signal propagation times between the headends and individual subscriber terminals coupled thereto.

7 Claims, 3 Drawing Figures

METHOD AND APPARATUS FOR POLLING SUBSCRIBER TERMINALS

BACKGROUND OF THE INVENTION

The present invention relates to communication systems such as two-way addressable cable television systems and more particularly to a method and apparatus for polling subscriber terminals or the like from a polling center remotely located from comunication centers that service the subscriber terminals.

In communication networks such as cable television systems, it is often necessary or desirable to access information from individual subscriber terminals coupled to the network. In a typical two-way cable television system, each subscriber is provided with an addressable converter that enables the selective reception of authorized television programs. Recent advances in the cable television art have enabled the provision of pay-per-view services, wherein the cable television customer has an opportunity to select specific programs, such as first-run movies, sporting events, and special presentations for viewing at a special fee over and above the standard monthly cable television charges. Other features available on cable television systems include shop at home, bank at home, and viewer opinion polling services.

In order for data to be efficiently transferred from an individual subscriber terminal to the cable system operator's communication center (often referred to as the "headend"), it is desirable for the cable system operator to first rapidly poll all of the subscriber terminals in the cable system to see which terminals have data to report. After completing such a quick poll, the system operator will only have to interrogate those specific terminals (i.e., converters) that indicated they had data to report.

In a more expansive communication network, several individual cable systems can be linked together for polling by a central polling center. One difficulty which has substantially slowed the collection of data from subscriber terminals distributed throughout a multiple system network has been the fact that the time required to retrieve data from the various systems depends upon the particular communication links used to tie the systems back to the polling center. Usually, it will require a greater amount of time to retrieve data from systems that are geographically further away from the polling center than those which are close to the polling center location. In cable television systems, such "linkage delays" are also caused by the various pre-demodulation and post-demodulation filters which are used in sending the cable television signals through the cable. In addition, the various cable systems in multiple system networks are often linked together using telephone lines, and the speed, quality and bandwidth of such telephone lines is a factor in the linkage delays which will occur between the systems and the polling center.

Those skilled in the art will appreciate that the objective of fast polling may be met by using a higher signalling rate or by organizing the subscriber terminal addresses in numerical order corresponding to their geographic location in the network, or both. Such solutions, however, have significant drawbacks. For example, high signalling rate polling requires greater bandwidth than slower polling techniques, and also uses equipment which is considerably more expensive. The alternative, i.e., numerical ordering of subscriber terminal addresses, is impractical for two reasons. First, changes in system topology (such as adding or deleting subscriber terminals) would require large numbers of terminals to be repeatedly relocated to preserve the numerical ordering. Second, subscriber terminal addresses are often held in secrecy because of known deficiencies in electronic security in pay TV control systems.

It would be advantageous to provide a method and apparatus for enabling the quick polling of subscriber terminals, in a communication network that includes various remotely located communication centers, without the disadvantages referred to above. Such a method and apparatus should accommodate various linkage delays between a central polling center and the various remotely located communication centers while maintaining the efficiency of the polling process as high as possible. The present invention relates to such a method and apparatus.

SUMMARY OF THE INVENTION

In accordance with the present invention, a method and apparatus are provided for polling subscriber terminals or the like in a two-way addressable communication network. The communication network includes a polling center and a plurality of remotely located communication centers (e.g., "headends") coupled to terminals to be polled.

The communication center in the network that has the greatest round trip signal propagation time to the polling center is identified and the propagation time is determined. The round trip signal propagation times for signals travelling between each of the other communication centers and the polling center are delayed to match the magnitude of the greatest round trip signal propagation time. This provides a uniform round trip signal propagation time between the polling center and all of the communication centers.

Polling command signals are successively sent to each terminal to be polled. After sending the first polling command signal of the succession, a time period equal to the magnitude of the greatest round trip signal propagation time is allowed to pass, and then responses from each polled terminal are successively received. The responding terminals are identified by the order in which their responses are received, said order being the same as that in which the successive polling command signals were sent.

In order to accommodate for variations in signal propagation times between the communication centers and each of the subscriber terminals serviced thereby, a uniform delay is inserted after each successive polling command signal. The magnitude of the uniform delay is calculated to allow for the maximum round trip signal propagation time between a communication center and a terminal coupled thereto.

The various delays introduced in accordance with the present invention can be programmable. In this manner, the expansion of a communication network by adding additional remotely located communication systems thereto is easily accommodated. If a new system added to the communication network has a round trip signal propagation time to the polling center that is greater than any of the prior systems coupled to the network, then the delays for all the prior systems can be increased to match the new maximum round trip signal propagation time. If a new system added to the network has a round trip signal propagation time to the polling center that is less than the time programmed into the prior systems in the network, then only the new system will have to be programmed with a delay so that its signal propagation time to the polling center is made uniform with that of all the other systems in the network.

DETAILED DESCRIPTION OF THE INVENTION

Figure 1:
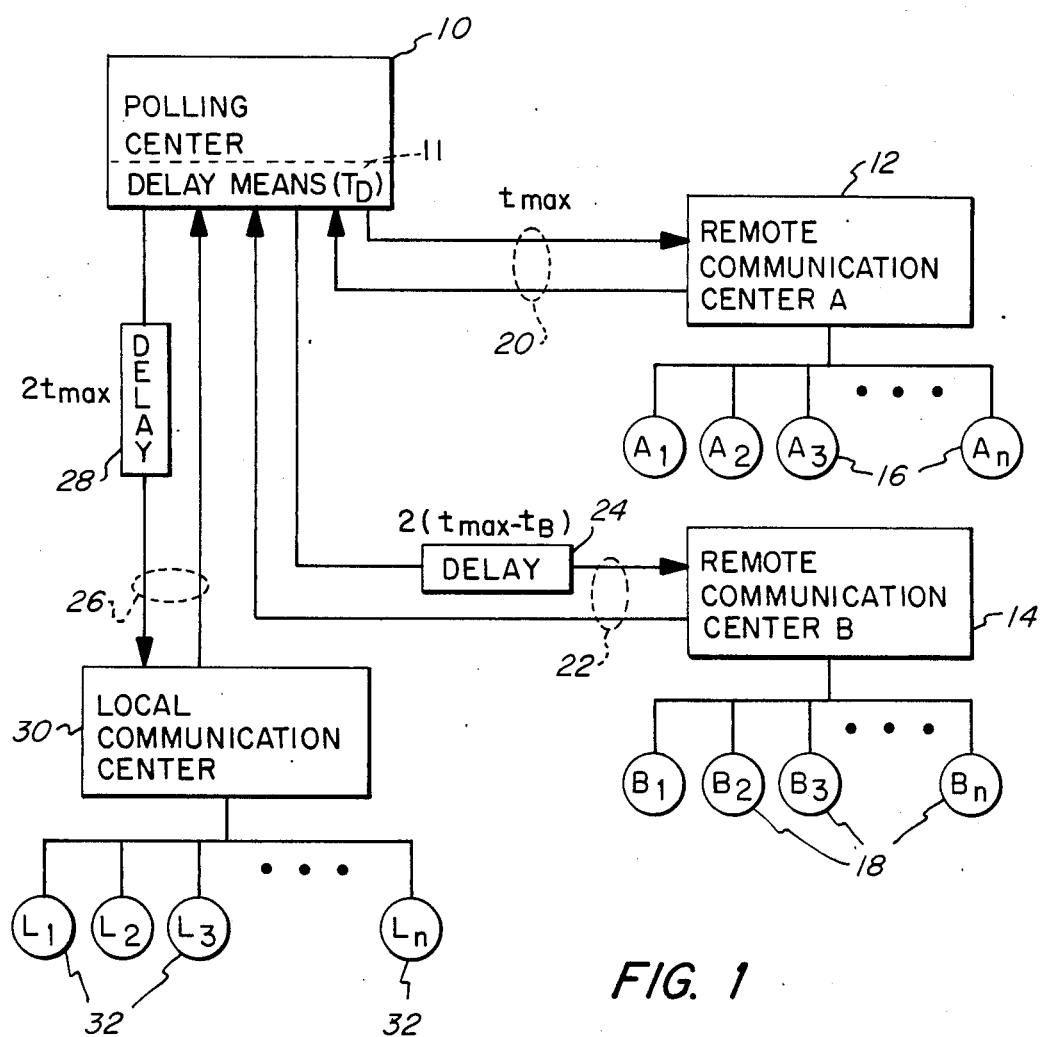
FIG. 1 is a block diagram of a communication network in accordance with the present invention.

A communication network in accordance with the present invention is illustrated in block diagram form in FIG. 1. Such a communication network can comprise, for example, a plurality of remotely located two-way addressable cable television systems connected to a common polling center. It will be understood that the present invention also applies to communication networks linking other types of communication systems including, inter alia, satellite broadcast systems.

In accordance with the present invention, a polling center 10 is used to collect information from a plurality of subscriber terminals serviced by remotely located two-way communication systems. For example, polling center 10 shown in FIG. 1 is coupled via a bi-directional communication path 20 to a remote communication center A designated by reference numeral 12. Remote communication center A can comprise a cable television system headend to which a plurality of addressable converters or subscriber terminals 16 ($A_1$-$A_n$) are coupled. Other remotely located cable television systems, such as remote communication center B designated by reference numeral 14 are also coupled to polling center 10. Remote communication center B is coupled to polling center 10 via a bi-directional communication path 22. A plurality of addressable subscriber terminals 18 ($B_1$-$B_n$) are coupled to remote communication center B.

A local communication center 30 which is located at the same geographic site as polling center 10 is coupled to the polling center through a bi-directional communication path 26. Local communication center 30 services a plurality of subscriber terminals 32 ($L_1$-$L_n$). The addresses of the various subscriber terminals $A_1$-$A_n$, $B_1$-$B_n$, and $L_1$-$L_n$ can be in arbitrary numerical order, there being no need in the present system to organize the terminals with their addresses in numerical order corresponding to their geographic location in the network.

Each of the addressable converters or subscriber terminals 16, 18, and 32 may contain data indicative of billing information, opinion survey responses, or other information which is to be communicated to polling center 10. In order to retrieve such data, polling center 10 will generate a series of polling command signals which are sent to each of the subscriber terminals via the associated communication center. Since the communication centers are located at different distances from the polling center, the time in which it takes polling command signals and responses thereto to travel back and forth between the communication centers and the polling center varies. In accordance with the present invention, it is necessary to determine the communication center in a communication network that has the greatest round trip signal propagation time to the polling center. Then, the magnitude of the greatest round trip signal propagation time is determined. The round trip signal propagation times for signals travelling between each of the other communication centers and the polling center are delayed to match the magnitude of the greatest round trip signal propagation time. In this manner, a uniform round trip signal propagation time is provided between the polling center and all of the communication centers coupled thereto.

In FIG. 1, remote communication center A is the furthest communication center from polling center 10, and thus the round trip signal propagation time for a signal travelling from polling center 10 to remote communication center A and back to polling center 10 is greater than the corresponding signal propagation times between the polling center and the other communication centers. The one-way signal propagation time for communication center A is thus designated $t_{max}$ and occurs in bi-directional communication path 20. The greatest round trip signal propagation time is consequently $2t_{max}$. In order to match this round trip signal propagation time in each of the other bi-directional communication paths, i.e., path 22 and path 26, a delay must be inserted into paths 22 and 26.

With respect to path 22, there will be some inherent one-way delay from polling center 10 to remote communication center B. This one-way signal propagation delay is designated $t_B$. Thus, in order to render the round trip signal propagation delay on communication path 22 equal to that inherent in communication path 20, a delay 24 having a magnitude equal to $2(t_{max}-t_B)$ must be inserted in communication path 22. As shown in FIG. 1, the delay 24 is inserted in the downstream communication path from polling center 10 to remote communication center B. It will be appreciated that delay 24 could alternately be placed into the upstream portion of communication path 22, or distributed over both the downstream and upstream signal paths. Since it is easier to build one delay than two such delays, the preferred embodiment as shown in FIG. 1 consists of only one delay 24 which provides an adequate delay in the round trip signal propagation time to match the round trip delay $2t_{max}$ between polling center 10 and remote communication center A.

Since local communication center 30 is located at the same site as polling center 10, there is no significant inherent signal propagation delay in communication path 26. In order to match the round trip signal propagation delay in communications between polling center 10 and local communication center 30 to the maximum round trip signal propagation time $2t_{max}$, a delay 28 having the magnitude $2t_{max}$ is provided in the downstream portion of bidirectional communication path 26.

Various means for providing the delays 24 and 28 are well known in the art and can comprise, for example, a shift register for delaying the output of a digital signal input thereto.

Figure 2:
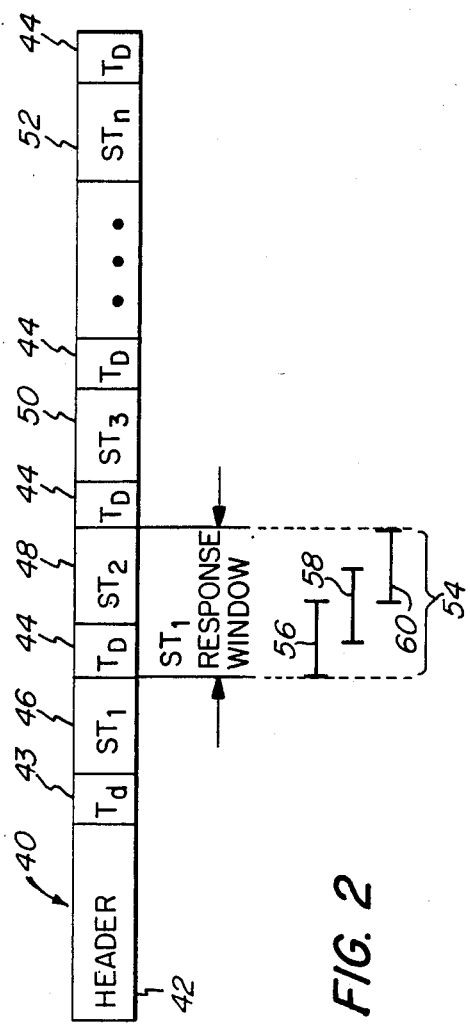
FIG. 2 is a graphic representation of a data packet containing polling command signals sent to a plurality of subscriber terminals.

A succession of polling command signals sent from polling center 10 to subscriber terminals 16, 18, and 32 is illustrated in FIG. 2. A data packet generally designated 40 commences with a header 42. The header can include a portion of the address information for the subscriber terminals to be polled together with parity and control bits which are necessary for the communication. A time delay 43, typically 3 bits in length, follows header 42 and is designated $T_d$. Where a data rate of 14 kilohertz is used, the 3 bits comprising time delay 43 amount to approximately 210 microseconds. This delay provides time for the subscriber terminals to commence looking for their individual addresses once the header instructions have been received.

The successive subscriber terminal polling commands (i.e., commands 46, 48, 50, 52) follow time delay 43. Each polling command is separated by a time delay 44 (designated $T_D$) which is also typically 3 bits in length to provide a 210 microsecond delay when a data rate of 14 kilohertz is used. Time delay 44 is inserted in the polling command signals by conventional delay means 11 which are provided as part of polling center 10. Thus, the first subscriber terminal polling command 46 ($ST_1$) is followed by a time delay $T_D$ 44 which, in turn, is followed by the second subscriber terminal polling command 48 ($ST_2$) and another time delay $T_D$ 44. Each successive subscriber terminal polling command (e.g., 50, 52) is followed by an identical time delay 44.

The uniform time delay 44 inserted after each successive polling command signal allows for variations in the signal propagation times between the communication centers ("headends") and the individual subscriber terminals ("converters") coupled thereto. As illustrated in FIG. 2, the time between the commencement of a time delay 44 and the completion of the following subscriber terminal polling signal (e.g., $ST_2$) establishes a response time window 54 for the previous subscriber terminal polling command (e.g., $ST_1$). If subscriber terminal $ST_1$ is geographically close to its associated headend, then little response time will be needed for its response signal to reach the headend and the response will be received immediately following the polling command as shown at 56. If subscriber terminal $ST_1$ is somewhat further away from its associated headend, then there will be a certain signal propagation time for the polling command signal to travel from the headend to the subscriber terminal and for the response signal to travel back from the subscriber terminal to the headend. In this case, the subscriber terminal response will be received at the headend within response window 54 but somewhat delayed after the completion of polling command signal $ST_1$ as indicated at 58. In the worst case situation, the response from the subscriber terminal $ST_1$ will be delayed such that it will not be completed until the very end of response window 54, as designated at 60. As long as the time delay $T_D$ is long enough to compensate for the worst case variation in signal propagation time between a headend and a subscriber terminal, the subscriber terminal response will be validly received within the response window 54.

Figure 3:
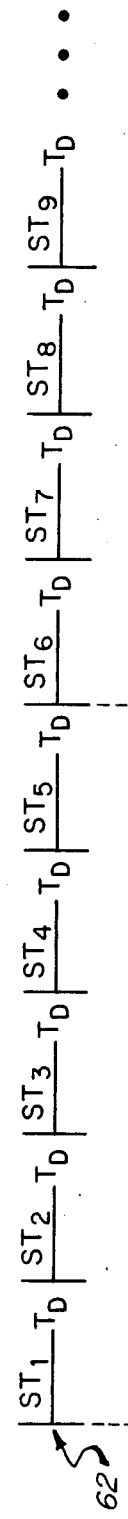
FIG. 3 is a timing diagram illustrating the receipt of polling responses relative to the sending of polling commands.
Figure 3:
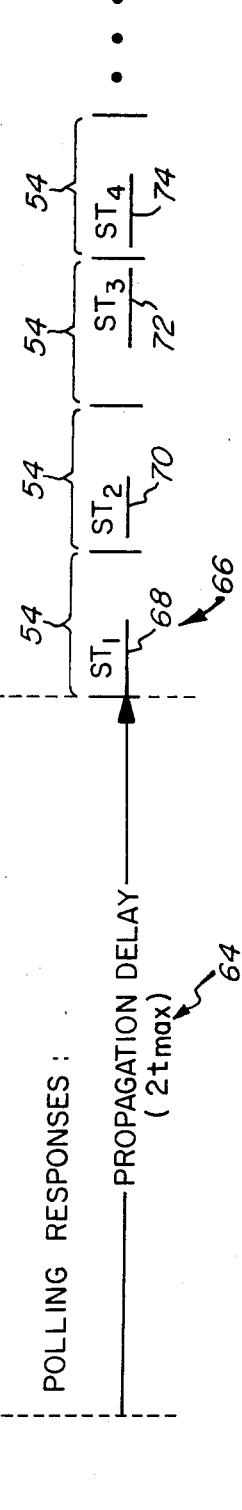

Turning to FIG. 3, a succession of subscriber terminal polling commands is generally designated 62. Each polling command (i.e., $ST_1$–$ST_9$) is followed by a uniform time delay $T_D$ as described above. Polling responses from the polled subscriber terminals will be received in order as shown at 66, after a round trip propagation delay ($2t_{max}$) 64. Each of the subscriber terminal responses 68, 70, 72, and 74 is received within the response time window 54 provided therefor.

It will now be appreciated that the present invention compensates for propagation delays in two-way communication systems. In a two-way addressable cable television system, there is a variable propagation delay between the time the headend transmits a polling command, and the time the polling response from the subscriber arrives back at the headend. The variability of the delay depends on the geographic location of the subscriber terminals. The closer the terminals are to the headend, the shorter the round trip signal propagation time, and vice versa. Furthermore, in a multiple system operation having a plurality of headends and one polling center, there is a variable propagation delay between the polling center and each of the headends. The present invention enables fast polling in such multiple two-way communication systems. A two-way programmable delay element is inserted between the polling center and each respective headend. The programmable delays are each programmed to make the delay between any headend and each respective polling center equal to a system constant which is equal to or greater than the maximum delay between the polling center and the furthest headend. In addition, a constant time interval is placed between each successive polling command to create a response time window. The added constant time interval is equal to the maximum variability of propagation delays between the closest subscriber terminal and the furthest subscriber terminal in any of the multiple systems present in the communication network.

Polling commands are transmitted continuously, but with the constant time interval between messages. Polling response messages are then received at the polling center within the response time window. Each respective polling response message is identified by the specific time window in which the message is received.

Although the present invention has been described in connection with a preferred embodiment, it will be appreciated that many modifications and adaptations thereto may be made without departing from the spirit and scope of the appended claims.

I claim:

1. A method for polling subscriber terminals or the like in a two-way addressable communication network having a polling center and a plurality of remotely located communication centers coupled to terminals to be polled by the polling center comprising the steps of:

identifying the communication center in the network that has a round trip signal propgation time to the polling center which is greater than the round trip signal propagation time between the polling center and any other communication center in the network;

determining the magnitude of said greatest round trip signal propagation time;

delaying the round trip signal propagation times for signals travelling between each of the other communication centers and the polling center to match the magnitude of said greatest round trip signal propagation time, thereby providing a uniform round trip signal propagation time between the polling center and all of the communication centers;

successively sending a polling command signal from said polling center to each terminal to be polled via the communication center to which the terminal is coupled;

waiting for a time period equal to the magnitude of said greatest round trip signal propagation time after sending the first polling command signal of said succession;

successively receiving responses from each polled terminal, via the communication center to which the terminal is coupled, after completing said wait; and identifying the responding terminals by the order in which their responses are received, said order being the same as that in which the successive polling command signals were sent.

2. The method of claim 1 comprising the further step of:

inserting a uniform delay after each successive polling command signal to allow for the maximum round trip signal propagation time between a communication center and a terminal coupled thereto.

3. Apparatus for polling subscriber terminals or the like in a two-way addressable communication network having a plurality of remotely located communication centers coupled to terminals to be polled comprising:

means for generating a succession of polling command signals each addressed to a different one of a plurality of terminals to be polled;

means for sending said polling command signals to the terminals to be polled via communication centers to which the terminals are coupled;

means for successively receiving a response signal from each polled terminal via the communication center to which the terminal is coupled, the amount of time it takes the polling command and response signals to be communicated to and from each communication center, respectively, establishing a round trip signal propagation time for each communication center; and means for equalizing the round trip signal propagation times required to communicate the polling command and response signals to and from each of the communication centers;

whereby the responses from the polled terminals are received in the same order in which the terminals are addressed by the polling command signals.

4. The apparatus of claim 3 further comprising:

means for inserting a uniform delay after each successive polling command signal to allow for variations in the time it takes a signal to propagate between the communication centers and individual terminals coupled thereto.

5. Apparatus, for polling subscriber terminals serviced by a plurality of remotely located two-way addressable cable television systems, comprising:

means for generating a succession of polling command signals each addressed to a different one of a plurality of subscriber terminals to be polled;

means for sending said polling command signals to a plurality of cable television headends, each headend coupled to relay polling command signals to different ones of said subscriber terminals;

means for successively receiving a response signal from each polled subscriber terminal via its associated headend, the amount of time it takes the polling command and response signals to travel to and from each of the headends, respectively, establishing a round trip signal propagation time for each headend; and means for equalizing the round trip signal propagation times required to communicate the polling command and response signals to and from each of the headends;

whereby the responses from the polled subscriber terminals are received in the same order in which the terminals are addressed by the polling command signals.

6. The apparatus of claim 5 further comprising:

means for inserting a uniform delay after each successive polling command signal to allow for variations in the time it takes a signal to propagate between the headends and individual subscriber terminals coupled thereto.

7. The apparatus of claim 6 wherein said sending and receiving means comprise a separate communication path to each of the headends and said equalizing means comprises programmable delay means provided in the communication paths for delaying signal propagation times in the paths by an amount necessary to render the round trip propagation time for each path equal.

* * * * *